United States Patent Office 3,652,574
Patented Mar. 28, 1972

3,652,574
CERTAIN 1,2,3,4 - TETRAHYDRO-5H-PYRIDO[4,3-b] INDOLES AND THE CORRESPONDING 1,2,3,4-TETRAHYDRO-9H-PYRIDO[3,4-b]INDOLES AND DERIVATIVES THEREOF
David L. Garmaise, Montreal, Quebec, Canada, assignor to Abbott Laboratories, Chicago, Ill.
No Drawing. Filed Apr. 1, 1970, Ser. No. 24,874
Int. Cl. C07d 31/42
U.S. Cl. 260—296 A    5 Claims

ABSTRACT OF THE DISCLOSURE

A new series of closely related compounds, the β- and γ-carbolines, carrying simple substituents in specific positions of the molecule were found to be highly effective against *T. cruzi* in very low concentrations.

DETAILED DESCRIPTION OF THE INVENTION

*Trypanosoma cruzi* is a progressive and contagious, insect-transmitted disease, frequently called Chagas' disease which is widespread in Latin America, affecting various mammals, including humans. It is estimated that in certain areas, 10 percent of the total population is infected; about ⅔ of all persons with the chronic disease are between the ages of 11 and 40. The infection progresses usually over a period of years, producing rhythm irregularities and other heart symptoms, intermittent fever, edema and other manifestations. The acute phase causes considerable enlargement of the lymph nodes, spleen and liver. Unfortunately, to date no successful control of the disease is known; the most promising methods involve destruction of the infected domestic animals and the disease spreading insects.

It has now been found that a new series of chemical compounds is highly effective against the flagellate stage of *T. cruzi*; they are the pyridoindole derivatives of the formula

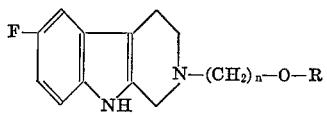

or

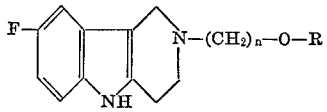

II wherein R is phenyl, tolyl, nitrophenyl, fluorophenyl, chlorophenyl or dichlorophenyl and $n$ is an integer from 1 to 4 and non-toxic acid addition salts thereof. The compounds of formula I are often referred to as 2,6-disubstituted 1,2,3,4-tetrahydro-β-carbolines or 1,2,3,4-tetrahydro - 9H - pyrido[3,4-b]indoles; those of structure II are the 2,8-disubstituted 1,2,3,4-tetrahydro-5H-pyrido[4,3-b] indoles or the corresponding γ-carbolines.

The new compounds show excellent activity against cultures of *T. cruzi* at concentrations between 1 and 100 p.p.m. The oral $LD_{50}$ values are between 500 and >1000 mg./kg.; thus, these compounds have a very impressive therapeutic index.

The compounds of the present invention can be made by simple heating of the 6-fluoro-1,2,3,4-tetrahydro-β-carboline or the corresponding 8-fluoro-γ-carboline with a compound of the formula R—O—(CH$_2$)$_n$—X wherein X is bromine or chlorine and R and $n$ have the above identified meaning. The reaction is carried out with the free carboline or an acid addition salt thereof in a suitable, inert, polar solvent such as dimethylformamide or dimethylacetamide and in the presence of a base such as pyridine or, preferably an alkali metal hydroxide, carbonate or bicarbonate, e.g., sodium hydroxide, potassium bicarbonate or carbonate. Ordinarily, one molar equivalent of the alkali hydroxide, carbonate or bicarbonate is sufficient when the carboline is used as the free base; where a carboline salt is the starting material, two molar equivalents are required. A 50–100% excess of the acid absorber can be used to insure that the new compound is obtained as the free base. The latter can easily be converted into the desired acid addition salt by known procedures.

In order to illustrate in detail the procedure for making the above compounds, reference is made to the following examples which however are not intended to limit the invention in any respect.

EXAMPLE 1

8-fluoro-2-[4-phenoxybutyl]-1,2,3,4-tetrahydro-5H-pyrido[4,3-b]indole hydrochloride A mixture of 7.85 g. of 8-fluoro-1,2,3,4-tetrahydro-5H-pyrido[4,3-b]indole hydrochloride, 10 g. of 4-phenoxybutyl-1-bromide, 8.7 g. anhydrous potassium carbonate and 8.6 g. potassium iodide in 150 ml. of dimethylformamide was heated with stirring at 80–85° C. for 7 hours. On cooling, the reaction mixture was poured into water and extracted with two 75-ml. portions of chloroform. After separation, the combined organic layers were washed with water, dried and evaporated to dryness. The residue was dissolved in methanol and acidified with ethanolic hydrochloric acid. The formed hydrochloride of the compound of structure II (R=phenyl; $n$=4) was recrystallized from ethanol yielding 5.44 g. (41.6%), M.P. 214–216° C. An analytical sample melted at 216–218° C.

EXAMPLE 2

8-fluoro-2-[3-phenoxypropyl]-1,2,3,4-tetrahydro-5H-pyrido[4,3-b]indole hydrochloride A mixture of 7.85 g. of 8-fluoro-1,2,3,4-tetrahydro-5H-pyrido[4,3-b]indole hydrochloride, 9.3 g. of 3-phenoxypropyl-1-bromide, 8.7 g. anhydrous potassium carbonate and 8.6 g. potassium iodide in 135 ml. of dimethylformamide was heated with stirring at 80–85° C. for 7 hours. The product of structure II (R=phenyl; $n$=3) was isolated as described in Example 1 to yield 4.87 g. (40.3%): 3.16 g. of a first crop, melting at 215–217° C. and 1.68 g. of a second crop melting at 213–215° C. An analytical sample melted at 215–217° C.

EXAMPLE 3

8-fluoro-2-[4-(p-fluorophenoxy)-butyl]-1,2,3,4-tetrahydro-5H-pyrido[4,3-b]indole hydrochloride A mixture of 5.67 g. of 8-fluoro-1,2,3,4-tetrahydro-5H-pyrido[4,3-b]indole hydrochloride, 7.7 g. of 4-(p-fluorophenoxy)-butyl bromide, 7.7 g. anhydrous potassium carbonate and 6.2 g. potassium iodide in 100 ml. of dimethylformamide was heated with stirring at 80–85° C. for 7 hours. The product of structure II (R=4-fluorophenyl; $n$=4) was isolated as in Example 1 to yield 4.88 g. (49.7%), melting at 214.5–216.5° C. An analytical sample, recrystallized from methanol, melted at 219–220° C.

EXAMPLE 4

8-fluoro-2-[3-(p-fluorophenoxy)-propyl]-1,2,3,4-tetrahydro-5H-pyrido[4,3-b]indole hydrochloride A mixture of 9.0 g. of 8-fluoro-1,2,3,4-tetrahydro-5H-pyrido[4,3-b] indole hydrochloride, 11.6 g. of 3-(p-fluorophenoxy)propyl bromide, 13.0 g. of anhydrous potassium carbonate and 9.9 g. of potassium iodide, was heated and stirred in the same way as in Example 1. The product was isolated as in the same example; it yielded the product of structure II (R=4-fluorophenyl; n=3) in an amount of 5.4 g. (35.5%), M.P. 202–205° C. The analytical sample, recrystallized from alcohol, melted at 206.5–207.5% C.

EXAMPLE 5

8-fluoro-2-[2-(p-fluorophenoxy)-ethyl]-1,2,3,4-tetrahydro-5H-pyrido[4,3-b]indole hydrochloride A mixture of 9.05 g. of 8-fluoro-1,2,3,4-tetrahydro-5H-pyrido[4,3-b]indole hydrochloride, 10.9 g. of 2-(p-fluorophenoxy)-ethyl bromide, 12.4 g. of anhydrous potassium carbonate and 9.9 g. of potassium iodide was treated under the same conditions as in Example 1 to yield 4.25 g. (29.6%) of the product of structure II (R=4-fluorophenyl; n=2) melting at 213.5–216° C. The analytical sample melted at 214–215.5° C.

EXAMPLE 6

2-[3-(p-chlorophenoxy)-propyl]-8-fluoro-1,2,3,4-tetrahydro-5H-pyrido[4,3-b]indole A mixture of 9.05 g. of 8-fluoro-1,2,3,4-tetrahydro-5H-pyrido[4,3-b]indole hydrochloride and 12.45 g. of 3-(p-chlorophenoxy)-propyl bromide was stirred and heated at 80–85° C. in 150 ml. of dimethylformamide with 11.09 g. of anhydrous potassium carbonate and 6.64 g. of potassium iodide. After 6 hours, the reaction mixture was cooled and poured into water. A solid crystallized; it was taken up in chloroform, washed, dried and evaporated under reduced pressure. The residue was recrystallized from ethanol, yielding 10.04 g. (70%) of the product of structure II (R=4-chlorophenyl; n=3), melting at 170–173° C. An analytical sample recrystallized from methanol, melted at 172–174° C.

EXAMPLE 7

8-fluoro-2-[3-(p-nitrophenoxy)-propyl]1,2,3,4-tetrahydro-5H-pyrido[4,3-b]indole

A mixture of 9.05 g. of 8-fluoro-1,2,3,4-tetrahydro-5H-pyrido[4,3-b]indole hydrochloride, 13.0 g. of 3-(p-nitrophenoxy)-propyl bromide, 11.04 g. anhydrous potassium carbonate and 6.6 g. potassium iodide were mixed in 200 ml. dimethylformamide and heated at 80° C. for 7 hours. The product was isolated as in Example 6 to give, after recrystallization from acetone, 9.0 g. (61%) of the product of structure II (R=4-nitrophenyl; n=3), melting at 181–184° C. An analytical sample melted at 182–184° C.

EXAMPLE 8

2-[3-(2,4-dichlorophenoxy)-propyl]-8-fluoro-1,2,3,4-tetrahydro-5H-pyrido[4,3-b]indole A mixture of 9.05 g. of 8-fluoro-1,2,3,4-tetrahydro-5H-pyrido[4,3-b]indole hydrochloride, 14.2 g. of 3-[2,4-dichlorophenoxy]-propyl bromide, 11.04 g. of anhydrous potassium carbonate and 6.6 g. of potassium iodide in 200 ml. of dimethylformamide was treated under the same conditions as in Example 1. Recrystallization from methanol yielded 7 g. (41%) of the product of structure II (R=2,4-dichlorophenyl; n=3) melting at 146–148° C. An analytical sample melted at 146–148° C.

EXAMPLE 9

8-fluoro-2-[3-(p-methylphenoxy)-propyl]-1,2,3,4-tetrahydro-5H-pyrido[4,3-b]indole A mixture of 9.05 g. of 8-fluoro-1,2,3,4-tetrahydro-5H-pyrido[4,3-]indole hydrochloride, 11.45 g. of 3-(p-methylphenoxy)-propyl bromide, 11.04 g. of anhydrous potassium carbonate and 6.6 g. of potassium iodide in 200 ml. of dimethylformamide were mixed and heated under the same conditions as described in Example 1. Recrystallization from methanol yielded 6.4 g. (47.5%) of the product of structure II (R=4-tolyl; n=3) melting at 125–131° C. An analytical sample, recrystallized from methanol, melted at 129–131° C.

EXAMPLE 10

6-fluoro-2-[4-(p-fluorophenoxy)-butyl]-1,2,3,4-tetrahydro-9H-pyrido[3,4-b]indole hydrochloride In a repetition of the procedure of Example 3, but using the corresponding β-carboline as the starting material, the compound of structure I (R=p-fluorophenyl; n=4) is obtained; the hydrochloride of the pure base melts at 204–6° C.

EXAMPLE 11

6-fluoro-2-[3-(p-fluorophenoxy)-propyl]1,2,3,4-tetrahydro-9H-pyrido[3,4-b]indole hydrochloride By using the corresponding β-carboline and 3-(p-fluorophenoxy)-propyl bromide as the reactants in the process of Example 3, the compound of structure I (R=p-fluorophenyl; n=3) is obtained. Its hydrochloride salt melts at 229–31° C.

EXAMPLE 12

6-fluoro-2-[4-(p-fluorophenoxy)-ethyl]-1,2,3,4-tetrahydro-9H-pyrido[3,4-b]indole hydrochloride In a repetition of the process of Example 5 but using the corresponding β-carboline and 2-(p-fluorophenoxy)-ethyl bromide as the reactants, the compound of Formula I (R=p-fluorophenyl; n=2) is obtained; its hydrochloride melts at 231–5° C.

EXAMPLE 13

6-fluoro-2-[3-phenoxypropyl]-1,2,3,4-tetrahydro-9H-pyrido[3,4-b]indole hydrochloride By repeating the procedure of Example 2, but using the corresponding β-carboline as the starting material, the compound of Formula I (R=phenyl; n=3) is obtained. The hydrochloride of the pure base melts at 251–3° C.

EXAMPLE 14

To test the activity against *T. cruzi*, standard techniques were used. As the test medium, sterilized brain heart infusion broth was used in 10-ml. amounts. The stock culture was grown on blood slants with an overlay of 7 ml. of brain heart infusion broth for one week at 28° C. The slants were prepared from 1.5 agar, 0.6 g. sodium chloride, 0.5 g. of dried pancreatic casein digest and 95 ml. of water; autoclaving this mixture for 15 minutes, cooling, adding 17 ml. of citrated rabbit blood and placing it in slanted test tubes in 10-ml. amounts. Standard tube dilution technique in 10-fold levels (100, 10 and 1 μg./ml. levels) were used. A test inoculum of 0.1 ml. of the undiluted 1-week stock culture was used and the tubes were incubated for 1 week at 28° C. The presence or absence of growth was read microscopically and, in questionable cases, under the microscope. The highest log dilution of the test compound was recorded in minimum inhibitory concentration (M.I.C.) values.

In this fashion, the compounds of Examples 3–5 and 8–13 showed a M.I.C. of 10 parts per million and the compound of Example 2 demonstrated a M.I.C. of 1 p.p.m.; other compounds of the new series showed a M.I.C. of 100 p.p.m.

The new compounds can be used for the above described purpose in the form shown by Formulas I and II or in the form of their non-toxic acid addition salts. Among the salts preferred are the hydrochlorides, sulfates, phosphates, tartrates, acetates, citrates, succinates and the like. The salts or bases can be administered in capsules, tablets, pills, wafers or as suspensions in a non-toxic carrier such as the usual sugar syrup. In each instance, they can be combined with the usual excipients such as flavoring agents, fillers and other tableting or suspension aids used in standard procedures for preparing oral dosage forms. For this route of administration, a dosage range of from 5 to 100 mg./kg. is preferred.

We claim:
1. The compound of the formula

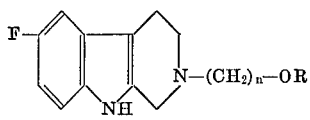

or

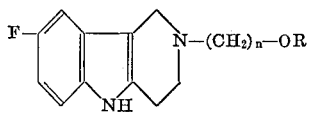

wherein R is phenyl, tolyl, chlorophenyl, dichlorophenyl, fluorophenyl, or nitrophenyl, $n$ is an integer from 1 to 4 or a non-toxic acid addition salt thereof.

2. The compound of claim 1 with structure II wherein R is phenyl and $n$ is 3.

3. The compound of claim 1 with structure II wherein R is 4-fluorophenyl and $n$ is an integer from 2 to 4, inclusive.

4. The compound of claim 1 with structure I wherein R is 4-fluorophenyl and $n$ is an integer from 2 to 4 inclusive.

5. The compound of claim 1 with structure I wherein R is phenyl and $n$ is 3.

References Cited
UNITED STATES PATENTS
3,382,250   5/1968   Johnson et al. _____ 260—296

ALAN L. ROTMAN, Primary Examiner

U.S. Cl. X.R.
260—295 S; 424—263, 266